(12) United States Patent
Oesterling et al.

(10) Patent No.: US 8,682,307 B2
(45) Date of Patent: Mar. 25, 2014

(54) DEVICE-INTEROPERABILITY NOTIFICATION METHOD AND SYSTEM, AND METHOD FOR ASSESSING AN INTEROPERABILITY OF AN ELECTRONIC DEVICE WITH A VEHICLE

(75) Inventors: Christopher L. Oesterling, Troy, MI (US); David P. Pop, Garden City, MI (US)

(73) Assignee: General Motors LLC, Detroit, MI (US)

( * ) Notice: Subject to any disclaimer, the term of this patent is extended or adjusted under 35 U.S.C. 154(b) by 251 days.

(21) Appl. No.: 13/226,458

(22) Filed: Sep. 6, 2011

(65) Prior Publication Data

US 2013/0059575 A1 Mar. 7, 2013

(51) Int. Cl.
*H04M 3/00* (2006.01)

(52) U.S. Cl.
USPC ........ 455/418; 455/404; 455/422.1; 455/416; 455/425; 455/412.1; 455/456.3; 455/461; 455/468; 455/66.1; 455/466; 455/41.2

(58) Field of Classification Search
USPC .......... 455/414.1, 456.1, 418, 466, 41.2, 404, 455/422.1, 416, 425, 412.1, 456.3, 461, 455/468, 66.1, 556.1; 701/36
See application file for complete search history.

(56) References Cited

U.S. PATENT DOCUMENTS

| 7,010,289 | B2 | 3/2006 | Jijina et al. | |
| 7,363,061 | B2 | 4/2008 | Kakehi | |
| 2004/0054444 | A1 | 3/2004 | Abeska et al. | |
| 2004/0180647 | A1* | 9/2004 | Schwinke et al. | 455/417 |
| 2004/0203696 | A1 | 10/2004 | Jijina et al. | |
| 2004/0239488 | A1* | 12/2004 | Douglass et al. | 340/426.11 |
| 2005/0027438 | A1* | 2/2005 | Rockett et al. | 701/200 |
| 2005/0038598 | A1* | 2/2005 | Oesterling et al. | 701/207 |
| 2005/0075095 | A1* | 4/2005 | Dillon | 455/412.2 |
| 2006/0089100 | A1* | 4/2006 | Patenaude et al. | 455/41.2 |
| 2006/0155437 | A1* | 7/2006 | Wang et al. | 701/29 |
| 2006/0190162 | A1* | 8/2006 | Ampunan et al. | 701/117 |
| 2006/0217875 | A1 | 9/2006 | Oesterling et al. | |
| 2006/0258377 | A1* | 11/2006 | Economos et al. | 455/461 |
| 2006/0258379 | A1* | 11/2006 | Oesterling et al. | 455/466 |
| 2007/0023497 | A1 | 2/2007 | Chuang et al. | |
| 2007/0090937 | A1* | 4/2007 | Stabler | 340/450.2 |
| 2007/0244628 | A1* | 10/2007 | Rockett et al. | 701/117 |
| 2007/0259674 | A1 | 11/2007 | Neef et al. | |
| 2008/0071546 | A1* | 3/2008 | Beiermeister et al. | 704/273 |
| 2008/0109317 | A1* | 5/2008 | Singh | 705/14 |
| 2010/0222962 | A1* | 9/2010 | Haydn et al. | 701/36 |
| 2010/0223346 | A1 | 9/2010 | Dragt | |
| 2011/0111726 | A1* | 5/2011 | Kholaif et al. | 455/404.2 |
| 2011/0144911 | A1* | 6/2011 | Madhavan et al. | 701/214 |
| 2012/0239223 | A1* | 9/2012 | Schwarz et al. | 701/2 |
| 2013/0012179 | A1* | 1/2013 | Watkins et al. | 455/418 |

* cited by examiner

*Primary Examiner* — Joseph Arevalo
(74) *Attorney, Agent, or Firm* — Dierker & Associates, P.C.

(57) ABSTRACT

A device-interoperability notification method and system are disclosed herein. The method involves establishing a connection between an electronic device and a telematics unit operatively disposed in a vehicle. Via the telematics unit, data obtained from the device is transmitted to a data aggregator at a call center. From the data, the data aggregator recognizes that an interoperability issue exists between the device and the vehicle within which the device is disposed. Via a communications module at the call center, a message is sent to the telematics unit or the electronic device, and this message includes information pertaining to an interoperability of the electronic device with the vehicle. The system includes elements to perform the steps of the method above. Also disclosed herein is a method for assessing the interoperability between an electronic device and a vehicle.

16 Claims, 4 Drawing Sheets

_US 8,682,307 B2_

DEVICE-INTEROPERABILITY NOTIFICATION METHOD AND SYSTEM, AND METHOD FOR ASSESSING AN INTEROPERABILITY OF AN ELECTRONIC DEVICE WITH A VEHICLE

TECHNICAL FIELD

The present disclosure relates generally to device-interoperability notification methods and systems, and to methods for assessing an interoperability of an electronic device with a vehicle.

BACKGROUND

Portable consumer electronic devices such as cellular phones, smart phones, laptop computers, notebook computers, mp3 players (e.g., IPOD®), tablet computers (e.g., IPAD®), and the like may, in some instances, be used inside a mobile vehicle. For example, the driver of the vehicle may connect his/her smart phone to the in-vehicle telematics unit via a short range wireless connection (e.g., a BLUETOOTH® connection) so that the driver can utilize the phone hands-free while driving. In some instances, an interoperability issue may exist with the use of a portable electronic device in a particular vehicle type.

SUMMARY

A device-interoperability notification method is disclosed herein. The method involves establishing a connection between an electronic device and a telematics unit operatively disposed in a vehicle. Via the telematics unit, data obtained from the electronic device is transmitted to a call center. From the data, a data aggregator at the call center recognizes that an interoperability issue exists between the electronic device and the vehicle within which the device is disposed. Via a communications module at the call center, a message is sent to the telematics unit and/or the electronic device, and this message includes information pertaining to an interoperability of the electronic device with the vehicle.

Also disclosed herein are a device-interoperability notification system, and a method for assessing an interoperability between an electronic device and a vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
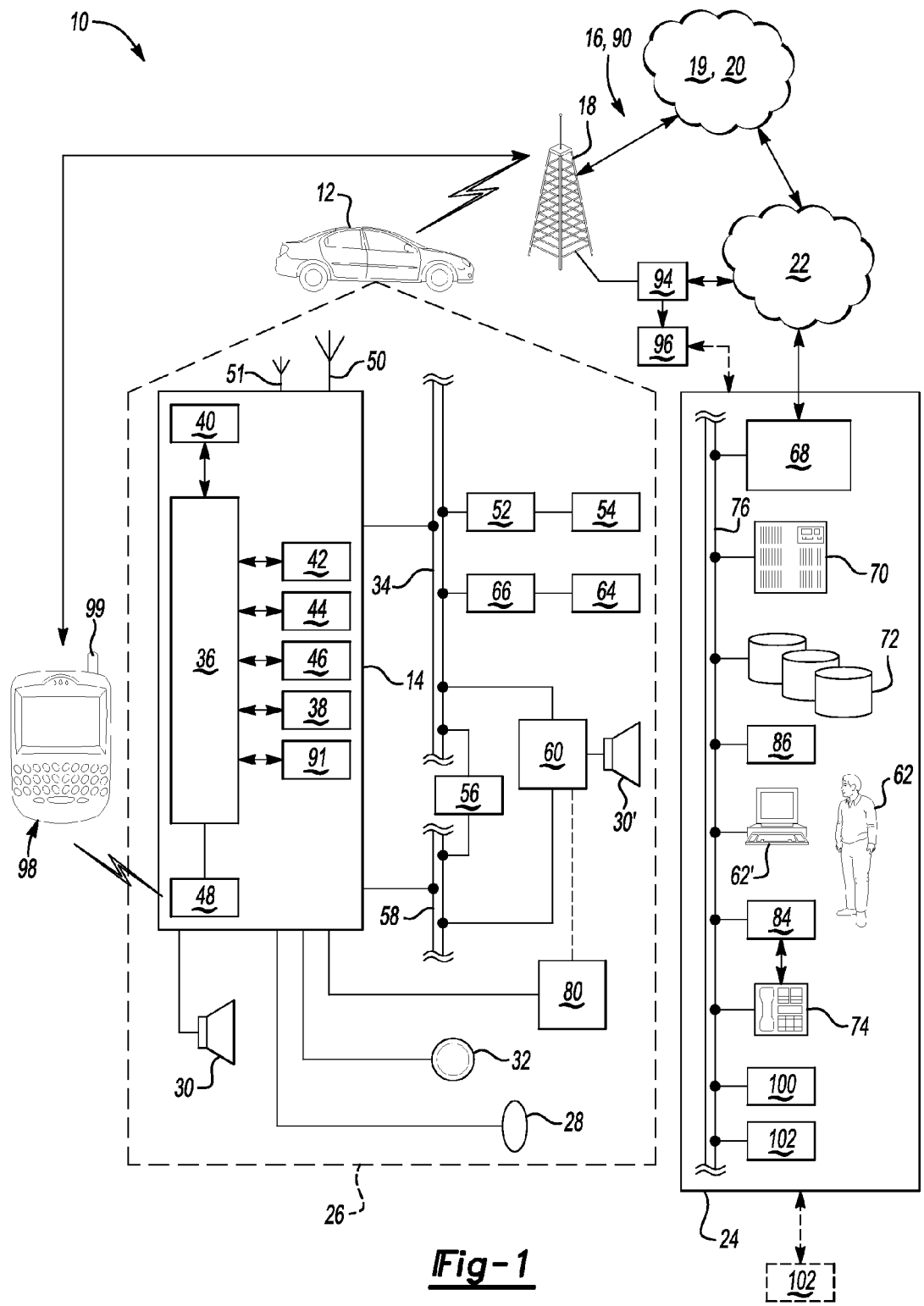
FIG. 1 is a schematic diagram depicting an example of a device-interoperability notification system.

In-house testing is often performed by vehicle manufacturers to assess an interoperability between portable consumer electronic devices and vehicles within which the electronic devices may be disposed and operated. The testing may be performed using physical testing methods performed by personnel at the vehicle manufacturer, at a third party test house, or at some other suitable facility. Data derived from the testing may, for example, be organized and presented in a consumer-accessible resource. Examples of the consumer-accessible resource include a webpage, a brochure, a booklet, or the like. The organized data presented in the consumer-accessible resource may, for example, identify the type of electronic device that was tested for use in a specific vehicle, and the feature(s) that is/are supported by that specific vehicle. In some cases, the resource may also provide some advice or instructions to enable a user of the device to configure the electronic device for use in a particular vehicle.

It has been found that in-house interoperability testing typically covers a small cross section of consumer electronic devices that are currently available in the market. Knowing that new electronic devices become available relatively quickly (e.g., every week or even every day), it has also been found that additional testing would be required on a regular basis to keep up with the quick release of new devices to consumers. This may, in some instances, be expensive and time consuming for the vehicle manufacturer. As such, the consumer-accessible resource produced by the manufacturer may not be inclusive for all electronic devices that are currently available to consumers. Yet further, the consumer-accessible resource may not be inclusive for all vehicle types, at least in part because some vehicles may not be available to the vehicle manufacturer at the time of testing.

Example(s) of the device-interoperability notification method and system as disclosed herein may be used, in part, to communicate information to a user pertaining to an interoperability of a portable consumer electronic device with the vehicle type within which the portable electronic device is then-currently disposed. The information pertaining to the interoperability between the vehicle and the electronic device is determined based on data pulled directly from the electronic device by an in-vehicle telematics unit when the device is connected. The connection may be accomplished via a short range wireless, e.g., BLUETOOTH®, connection, or by a wired connection (e.g., through a vehicle USB port). The telematics unit forwards the data to a telematics call center, where the data is used to determine the interoperability of the device with the vehicle. In some instances, the data is utilized to identify the device as one that is known to have an interoperability issue with the vehicle within which the device is disposed. In these instances, the call center may notify the user (via, e.g., a message sent to the telematics unit and/or to the electronic device) that an interoperability issue exists, and perhaps offer some advice for how to make the device compatible with the vehicle so that the user can use the device in the manner desired. In other instances, the data is utilized to identify that the device is not one that is known to have an interoperability issue with the vehicle. In these instances, the method invokes an interoperability assessment method, where the data is forwarded to a testing facility that performs interoperability testing on a device of the same make and model as the user's device and a vehicle of the same vehicle type that the user's device is then-currently disposed in. The results from the testing may be utilized to formulate the notification message to be sent to the user. It is believed that the notification method may at least improve vehicle quality and consumer experience.

Also disclosed herein is a method for assessing an interoperability of the user's device and the vehicle. Example(s) of this method involve testing, at a testing facility, the interoperability of a device of the same make and model as the user's device with a vehicle of the same vehicle type as the vehicle within which the user's device is disposed. The results from the interoperability testing of the electronic device may be reported in a consumer-accessible resource, such as on a consumer-accessible webpage. It is believed that this consumer-accessible webpage contains up-to-date information for a large cross section of electronic devices.

As used herein, the term "user" refers to any person in possession of an electronic device, and the user, in an example, may be a vehicle owner, a vehicle driver, and/or a vehicle passenger. In instances where the user is the vehicle owner, the term "user" may be used interchangeably with the terms subscriber and/or service subscriber. Further, when the user owns the electronic device, the user may also be referred to herein as a consumer.

Further, an electronic device that is being "operated" inside the vehicle is one that is connected to the vehicle with or without a wire. By this connection, and so long as the electronic device is compatible with the vehicle, functions of the device may be performed utilizing one or more vehicle systems. For example, calling and call-receiving functions of a smart phone may be performed utilizing a telematics unit of the vehicle once the smart phone has been connected to the vehicle, e.g., through a short range wireless connection such as a BLUETOOTH® connection. In another example, an audio playing function of an mp3 player may be performed utilizing the audio component disposed in the vehicle once the mp3 player has been connected to the vehicle, e.g., via a wire.

Additionally, the term "interoperability" is used in connection with functions of the device (e.g., call-receiving function, audio playing function, Internet accessing function, etc.), and refers to the compatibility of the function(s) of the portable electronic device with a vehicle. In instances where an "interoperability issue" exists, at least one function of the device is incompatible with the vehicle.

It is to be understood that the methods of the instant disclosure are accomplished after a connection is established between the portable electronic device and a telematics unit of the vehicle within which the device is disposed. Thus, the inability to establish a connection (e.g., a short range wireless connection or a connection made with a wire) is not considered to be an interoperability issue. If a user finds that he/she cannot establish a connection between the electronic device and the telematics unit, then the user may contact the telematics call center directly for assistance, and the methods described herein are not applied.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

FIG. 1 described in detail below depicts a device-interoperability notification system (identified by reference numeral 10). This system 10 may also be used to perform the steps of the method of assessing an interoperability of an electronic device and a vehicle described below in conjunction with FIG. 4. For purposes of the instant disclosure, the electronic device is a portable device that includes active electrical components (e.g., transistors, diodes, integrated circuits, etc.), and this device utilizes the electricity or the flow of electrons to perform various operations of the device. Examples of the portable electronic device include mobile communications devices such as cellular phones and smart phones, laptop computers, notebook computers, tablet computers (e.g., IPAD®), mp3 players (e.g., IPOD®), and/or the like.

It is to be understood that the system 10 described herein utilizes a vehicle-dedicated communications device (i.e., a telematics unit 14) as a gateway for a service center (such as a telematics service or call center 24) to communicate with an electronic device 98. As examples, the service center may obtain information from the device 98 for use in assessing the interoperability of the device 98 with the vehicle 12, provide notification messages to the device 98 in instances where an interoperability issue exists between the device 98 and the vehicle 12, provide advice for how to make the device 98 compatible with the vehicle 12, etc. Further, the system 10 shown in FIG. 1 utilizes a car as a mobile vehicle 12 within which the electronic device 98 is then-currently disposed.

Aside from the vehicle 12, the telematics unit 14 and the electronic device 98 disposed in the vehicle 12, the system 10 depicted in FIG. 1 further includes a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics call centers 24. In an example, the carrier/communication system 16 is a two-way radio frequency communication system, and may be configured with a web service supporting system-to-system communications (e.g., communications between the telematics call center 24 and the service provider 90).

The wireless carrier/communication system 16 may be used to establish communication between a mobile communications device (e.g., the electronic device 98 if the electronic device has wireless communication capabilities) and the telematics unit 14. For example, a user of the device 98 (e.g., when outside the vehicle 12) may call the telematics unit 14 over the wireless carrier/communication system 16. However, for devices having short range wireless connection capabilities, when the device 98 is located within close proximity (i.e., a distance suitable for short range wireless communication) of the telematics unit 14, communication between the device 98 and the telematics unit 14 may be established via short range wireless connection (e.g., by pairing the telematics unit 14 and the device 98 using a BLUETOOTH® or the like). In one example, the device 98 is in close proximity of the telematics unit 14 when the device 98 is inside the passenger compartment (i.e., the cabin area) of the vehicle 12. Further details of pairing the device 98 with the telematics unit 14 will be provided below.

In an example, the carrier/communication system 16 also includes a host server 94 including suitable computer equipment (not shown) upon which information of a remotely accessible page 96 resides/is stored. For instance, the remotely accessible page 96 may be a webpage set up and maintained by a telematics service provider, and the user may access the page 96 by, e.g., submitting personal information (e.g., a login ID) and authenticating information (e.g., a password, a PIN, etc.). The computer equipment used to log into the page 96 may also include hardware which, for example, can receive and read a smart card for identification/authentication purposes, or can utilize biometrics for identification/authentication purposes.

In an example, the webpage 96 is a consumer-accessible informational resource that may be used to educate a consumer (e.g., the user of the electronic device 98) on the interoperability of his/her electronic device 98 and the vehicle 12 within which the device 98 is disposed. This webpage 98 may identify the different devices tested in specific vehicles, and which features of the device 98 are supported by the vehicle 12. The webpage 96 may further provide helpful advice for configuring the device 98 for use in the vehicle 12.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16.

Some of the vehicle hardware 26 is generally shown in FIG. 1, including the telematics unit 14 and other components that are operatively connected to the telematics unit 14. Examples of other hardware 26 components include a microphone 28, speakers 30, 30' and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34, as mentioned above. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the telematics call center 24 via the carrier system 16, and is capable of calling and transmitting data to the telematics call center 24.

The telematics unit 14 provides a variety of services, both individually and through its communication with the telematics service center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short range wireless communication network 48 (e.g., a BLUETOOTH® unit), and/or a dual antenna 50. In one example, the wireless modem 42 includes a computer program and/or set of software routines (i.e., computer readable instructions embedded on a non-transitory, tangible medium) executable by the processing device 36.

As mentioned above, the short range wireless communication unit 48 (e.g., the BLUETOOTH® unit) may be used to connect to the electronic device 98 with the telematics unit 14 once the devices 14, 98 have been paired. In an example, the telematics unit 14 continuously monitors for the presence of the electronic device 98 using a short range wireless antenna 51, and attempts to connect with the device 98 upon recognizing the presence of the device 98. In another example, the electronic device 98 continuously monitors for the presence of the telematics unit 14 using its own short range wireless antenna 99. The device 98 attempts to connect with the telematics unit 14 upon recognizing the presence of the telematics unit 14; which typically occurs as soon as the device 98 is placed within the short range wireless range of the telematics unit 14. The device 98 or the telematics unit 14 alone may be configured to monitor for the presence of the other device, or both of the devices 14, 98 may be configured to monitor for the presence of the other device at the same time.

It is to be understood that the device 98 and the telematics unit 14 attempt to connect during each encounter between the devices 14, 98 after the devices 14, 98 have been paired. The device 98 and the telematics unit 14 are actually paired when the telematics unit 14 and the device 98 exchange security codes/passwords with each other. This enables the telematics unit 14 and the device 98 to communicate typically under a secured connection. As a more specific example, pairing may involve setting the device 98 to a short range wireless discovery mode (such as by selecting, on the device 98, a discovery mode function as a menu option, icon, or the like). While in the discovery mode, other devices having a short range wireless communication system (such as the telematics unit 14) are allowed to detect the presence of the device 98. When the telematics unit 14 locates the device 98, the device 98 automatically provides the type of device it is (e.g., a cellular phone) and its short range wireless connection name. This short range wireless connection name may, for instance, be selected by the user or provided by the manufacturer of the device 98. The device 98 may then prompt the user to enter a security code/password, and this security code/password is sent to the telematics unit 14. Upon receiving the security code/password, the telematics unit 14 sends its own security code/password to the device 98 to ultimately pair the two devices 14, 98 together.

Once the two devices 14, 98 have been paired and whenever they are within short range wireless communication range of each other, the telematics unit 14 can directly communicate with the device 98, and voice communications received at the device 98 are transmitted to the user hands/free via the telematics unit 14.

Connection of the electronic device 98 with the telematics unit 14 may otherwise be accomplished via a wired connection, such as via a USB connection. In this example, the electronic device 98 may be equipped with a USB connection port to which a USB cord is connected. Another USB connection port may be provided inside the vehicle 12, and is configured to receive an opposing end of the USB cord. The USB connection port inside the vehicle 12 may be connected directly to an audio component 60, which is in operative communication with the telematics unit 14 via a bus 34.

It is to be understood that the telematics unit 14 may be implemented without one or more of the above listed components (e.g., the real time clock 46), except in some examples disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14, as well as computer readable code for performing various steps of the examples of the methods disclosed herein. The computer readable codes of the software programs run by the processor 36 contain computer readable instructions embedded on a non-transitory tangible medium.

Data from the electronic device 98 may be obtained, by the telematics unit 14, when the two devices 14, 98 are connected (either via a short range wireless connection or a wired connection). In some instances, the telematics unit 14 may forward the data to the call center 24 upon receiving it. In other instances, the data is temporarily stored in the electronic memory 38, and the telematics unit 14 may forward the data to the call center 24 at a later time. The transmission of the stored data from the telematics unit 14 to the call center 24 may occur during a vehicle data upload (VDU) event. The VDU event may occur, for instance, during a voice connection in the form of packet data over a packet-switch network (e.g., voice over Internet Protocol (VoIP), communication system 16, etc.). The telematics unit 14 includes a vehicle data upload (VDU) system 91 or is interfaced to the VDU system 91. As used herein, the VDU system 91 is configured to receive data (e.g., the stored data of the electronic device 98) from the memory 38, packetize the data and place the data into a suitable format for uniform transmission to the communications module 86 or data aggregator 100 at the call center 24, and transmit the packetized data message to the communications module 86 or the data aggregator 100. When data is sent to the aggregator 100, data may be retrieved from the aggregator 100 or data may be distributed from the aggregator 100. In some cases, the data stored in the memory 38 may already be packetized, and in such instances, the VDU 91 will simply revise the format for uniform transmission of the data to the call center 24. Revising the format may include, for example, re-packetizing the data for transmission over the wireless communication system 16 (which may require a different format than the format of the data stored in the memory 38). In one example, the VDU 91 is operatively connected to the processor 36 of the telematics unit 14, and thus is in communication at least with the communications module 86 or data aggregator 100 via the buses 34 and 76 and the communication system 16. In another example, the VDU 91 may be the telematics unit's central data system that can include its own modem, processor, and onboard database. The database can be implemented using a separate network attached storage (NAS) device or be located elsewhere, such as in the memory 38, as desired. The VDU 91 has an application program that handles all of the vehicle data upload processing, including, for example, communication with the data aggregator 100.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices using some suitable type of wireless technology. The cellular chipset-component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi. In other instances, the protocol is Evolution Data Optimized (EVDO) Rev B (3G) or Long Term Evolution (LTE) (4G).

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like, as well as data obtained from the electronic device 98 as previously mentioned.

The telematics unit 14 provides numerous services alone or in conjunction with the telematics service center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the telematics service center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and the call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58. In an example, the audio component 60 may have a USB connection port connected thereto that is configured to receive a USB cord or wire that is connected the electronic device 98. In this way, the electronic device 98 is connected to the telematics unit 14 via a wire, and once connected, the telematics unit 14 can pull information from the device 98 through the bus 34 and the USB wire connected to the audio component 60 via the USB connection port.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, and/or the like. One or more of the sensors 64 enumerated above may be used to obtain vehicle data for use by the telematics unit 14 or the telematics service center 24 (when transmitted thereto from the telematics unit 14) to determine the operation of the vehicle 12. Example sensor interface modules 66 include powertrain control, climate control, body control, and/or the like.

The vehicle hardware 26 includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the telematics service center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The call centers 24 of the telematics service provider are designed to provide the vehicle hardware 26 with a number of different system back-end functions. According to the example shown in FIG. 1, one call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call center 24 functions. Further, the various operations of the call center 24 are carried out by one or more computers (e.g., computer equipment 74) programmed to carry out some of the tasks of the service center 24. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices, such as the server 70 and database 72.

In an example, the telematics call center 24 further includes the data aggregator 100 which is embodied at the telematics call center 24 as a data aggregation module. The data aggregator 100 may be in selective and operative communication with the telematics unit 14 via the communication system 16, and may, in some instances, receive and bin data of the electronic device 98 received from the telematics unit 14 during the VDU event. The data aggregator 100 may otherwise be operatively connected to the communication module 86 at the call center 24 (via, e.g., the bus 76), and may be configured to receive and bin the electronic device 98 data upon receiving it from the communications module 86. In these instances, the data aggregator 100 may simply be a data repository. In other instances, the data aggregator 100 is also capable of running computer readable code/software routines for receiving and processing the electronic device 98 data, e.g., to identify the electronic device 98 as one that is known to have, or one that is not known to have had an interoperability issue with the vehicle 12 (i.e., the vehicle within which the electronic device 98 is disposed). Other computer readable code/software routines that the data aggregator 100 may be capable of running include those for formulating messages based on results from interoperability testing based on i) the data obtained from the electronic device 98 or ii) previously stored data obtained from a plurality of other electronic devices, etc.

In an example, the data aggregator 100 (in instances where it includes its own processor) or the processor 84 may further contain computer readable code for sending (i.e., communicating) the message formulated based on the results of interoperability testing to another entity, such as the telematics unit 14, the electronic device 98, the webpage 96, the manufacturer of the vehicle 12 and/or the manufacturer of the device 98. Sending the message to the other entity may be accomplished via a wireless connection, a landline, the Internet, a short message service message, and/or the like. In an example, the data aggregator 100 (or the processor 84) further includes suitable computer readable code for filtering the data contained in the message and/or for performing data conditioning processes to place the data contained in the message in a proper form for transmission to the other entity.

As briefly mentioned, in an example, the data aggregator 100 may contain suitable communications equipment (such as a modem to establish an Internet connection) to upload the results to the host server 94 of the consumer-accessible webpage 96.

Further, the database(s) 72 may be designed to store subscriber profile records, subscriber behavioral patterns, or any other pertinent subscriber information. In an example, the database(s) 72 may be configured to store a subscriber profile, which may contain personal information of subscriber (e.g., the subscriber's name, garage address, billing address, home phone number, cellular phone number, etc.), as well as subscriber selected preferences (e.g., how the message should be presented to the user, etc.). In an example, data obtained from the electronic device 98 may be stored in the subscriber or user profile in one of the databases 72, and this data may be used, at some point, for interoperability testing. In some instances, the user profile has stored therein previously-obtained data of the electronic device 98, and this previously-obtained or previously-stored data may be used (e.g., by the data aggregator 100) in combination with data that is then-currently obtained from the electronic device 98 to formulate an appropriate interoperability data message for, e.g., the user of the device 98.

The databases 72 may also be configured to store a master database that contains data for different combinations of electronic devices and vehicle types. This data may include, e.g., at least an indication of whether or not an interoperability issue between a particular device and a particular vehicle type has previously been determined to exist. In some instances, the master database may also include additional data, such as the types of interoperability issues found to exist between a particular device and a particular vehicle type and/or instructions for how to render the device compatible with a particular vehicle type. The master database may be used, e.g., by the data aggregator 100 when assessing the interoperability of electronic device 98 and the vehicle 12, when formulating a notification message for the user, and/or when reporting additional information onto the consumer-accessible webpage 96. Further details of the master database will be provided below.

The communications module 86 of the service center 24 may be configured, via suitable communications equipment (such as equipment capable of handling messaging between the telematics service center 24 and the telematics unit 14 (e.g., vehicle communication protocols), modems, TCP/IP supporting equipment, and/or the like), to enable the telematics service center 24 to establish a communication with the telematics unit 14, or visa versa. The communications module 86 is capable of receiving data messages (e.g., packet data) from the telematics unit 14, identify that the data pertains to the electronic device 98 and that the device 98 may have interoperability issues with the vehicle 12 within which the device 98 is being operated, and transmit the data to the data aggregator 100. The data aggregator 100 may recognize the electronic device 98 because the data includes at least a device identification profile (DIP), which is a BLUETOOTH® profile that allows the electronic device 98 to be identified. The profile also enables identification of the manufacturer of the device 98, a product identification (ID), a product version, and a version of the device ID specification currently being used. In other words, the information contained in the profile provides enough information to identify what device 98 is being used. The data aggregator 100 may run computer readable code/software routines that can receive the data and determine if interoperability testing needs to be performed utilizing the data. The data itself can be identified by the filename (e.g., mp3 audio data to be sent to the vehicle audio system 60, mp4 video data to be rendered on a multimedia display, etc.) or by the form of the data (e.g., text to be presented on the vehicle display 80, etc.)

It is to be appreciated that the call center 24 may be any central or remote facility, manned or unmanned, mobile or fixed, to or from which it is desirable to exchange voice and data communications. As such, the live advisor 62 may be physically present at the service center 24 or may be located remote from the service center 24 while communicating therethrough.

In an example, the call center 24 further includes or is in communication with a testing facility 102 that is designed to perform interoperability testing on electronic devices with particular types of vehicles. The types of vehicles include those of different makes and models. In an example, the testing facility 102 is physically located at the call center 24, and this testing facility 102 includes computer and communication equipment that is in communication with other call center equipment such as the data aggregator 100, the processor 84, databases 72, etc. via the bus 76. The computer equipment (not shown) of the testing facility 102 includes a computer readable medium upon which computer readable code is encoded, and this computer readable code utilizes the electronic device 98 data received from the data aggregator 100, the databases 72, and/or the like, for interoperability testing. In some cases, the data received at the testing facility 102 is utilized in interoperability testing that is physically performed, e.g., by personnel at the testing facility 102. The person(s) performing the testing may, e.g., log or enter results obtained from the testing into a program run by the computer equipment at the testing facility 102. These results may afterwards be forwarded from the testing facility 102 to the data aggregator 100 via the bus 76.

The testing facility 102 may otherwise be a facility that is separate from the call center 24 (e.g., the testing facility 102 may be located in another building, in another city, in another state, etc.), as shown in dotted lines in FIG. 1. As a separate facility, the testing facility 102 may be fully equipped with processing equipment, communications equipment, personnel, etc. In an example, upon identifying that the electronic device 98 is not known to have an interoperability issue with the vehicle 12, the data aggregator 100 may command the communications module 86 to send the electronic device 98 data (e.g., in the form of packet data) to the remotely-located testing facility 102, and the data may thereafter be used for interoperability testing performed in a computational manner, such as by one or more programs run by the processing equipment at the facility 102, or in a physical manner, such as by personnel at the facility 102.

Details of the interoperability testing performed by the testing facility 102 will be described below.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider service center 24, the telematics service provider is a separate and distinct entity from the network provider 90. In an example, the equipment, employees, etc. of the communications network provider 90 are located remote from the service center 24. The communications network provider 90 provides the user with telephone and/or Internet services, while the telematics service provider provides a variety of telematics-related services (such as, for example, those discussed hereinabove). The communications network provider 90 may interact with the service center 24 to provide services (such as emergency services) to the user.

While not shown in FIG. 1, it is to be understood that in some instances, the telematics service provider operates a data center, which receives voice or data calls, analyzes the request associated with the voice or data call, and transfers the call to an application specific telematics service center associated with the telematics service provider. It is further to be understood that the application specific telematics service center may include all of the components of the data center, but is a dedicated facility for addressing specific requests, needs, etc. Examples of application specific telematics service centers include, but are not limited to, emergency services call centers, navigation route call centers, in-vehicle function call centers, or the like.

The telematics service center 24 components shown in FIG. 1 may also be virtualized and configured in a Cloud Computer, that is, Internet-based computing environment. For example, the computer equipment 74 may be accessed as a Cloud platform service, or PaaS (Platform as a Service), utilizing Cloud infrastructure rather than hosting computer equipment 74 at the telematics service center 24. The database 72 and server 70 may also be virtualized as a Cloud resource. The Cloud infrastructure, known as IaaS (Infrastructure as a Service), typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

Examples of the device-interoperability notification method will now be described herein in conjunction with FIGS. 1-3. It is to be understood that the examples of this method require that an electronic device (such as the device 98) be physically located inside a mobile vehicle (such as the vehicle 12). This is so that the electronic device 98 may be within a short range wireless connection range of the telematics unit 14 or may be connected to the telematics unit 14 via a wire. In an example, the electronic device 98 may be a cellular phone owned by the driver or passenger of the vehicle 12. Upon entering the vehicle 12, the driver or passenger may place the phone somewhere inside the vehicle 12 cabin area, such as in a cup holder, on a tray attached to a center console disposed between driver and passenger seats, on the dashboard, on the passenger seat, or the like. In another example, the electronic device 98 may be an mp3 player (e.g., an IPOD® or the like) owned by a passenger of the vehicle 12. Upon entering the vehicle 12, the passenger may connect the mp3 player (via, e.g., a USB connector, cord, or the like) to a USB connection port inside the vehicle 12.

It is further to be understood that the examples of the method require that the electronic device 98 be powered on and be at least in an operation-ready state while being physically located inside the vehicle 12. This is so that the telematics unit 14 can readily connect with the electronic device 98 while the device 98 is located inside the vehicle 12. Through this connection, the telematics unit 14 can i) pull data from the electronic device 98 (which may ultimately be used, by the call center 24, to assess the interoperability with the vehicle 12 within which the device 98 is currently located) and ii) forward messages to the device 98 that had been formulated at the call center 24, where such messages contain information pertaining to the interoperability of the device 98 with the vehicle 12.

An example of the device-interoperability notification method includes connecting the device 98 (which is i) located in the vehicle 12, and ii) is in an operation-ready state) with the telematics unit 14 when connected. This step is shown as reference numeral 200 in FIG. 2. For wireless connection, in some cases, a connection cannot be made until the electronic device 98 has been associated with the telematics unit 14. This may be accomplished by registering both the telematics unit 14 and the device 98 with the call center 24, and examples of the registration process are described hereinbelow. It is to be understood that the device 98 and the telematics unit 14 may be paired upon registering, or prior to registering the devices 14, 98, and thus the device 98 may connect with the telematics unit 14 (via, e.g., a BLUETOOTH® connection) whenever the device 98 is within short range of the telematics unit 14.

In an example, registering may be accomplished by accessing (via, e.g., a computer station having Internet access capabilities) another remotely accessible page or webpage (not page 96 shown in FIG. 1) of the telematics call center 24, and submitting, into a login screen on the webpage, an acceptable login and password (or identifying and authenticating information). Once the webpage has been accessed, the person accessing the webpage (which is typically an authorized user of the vehicle 12) may select (e.g., by selecting a menu option or an icon displayed on the webpage screen) a program configured to associate the electronic device 98 with the telematics unit 14. In some cases, associating the device 98 with the telematics unit 14 is the same as enrolling the device 98 in a program for device-interoperability notification services while the vehicle 12 is in operation. In an example, the user may access a user profile through the call center webpage, which typically includes information pertaining to the user and the user's vehicle 12. In many cases, the user profile will also include identification information of the in-vehicle telematics unit 14 (e.g., its serial number and the mobile dialing number (MDN), and perhaps any electronic devices that have already been paired (via, e.g., a BLUETOOTH® connection) with the telematics unit 14). In these cases, the user submits identification information of the device 98 (e.g., its serial number, phone number, short range wireless security information, etc.), and indicates (e.g., via a mouse click on an appropriate icon or menu option on the webpage) to associate the two devices 14, 98. In cases where the telematics unit 14 is not identified in the user's profile, the user may submit both identification information of the telematics unit 14 and identification information of the device 98, and indicate on the webpage that the telematics unit 14 and the device 98 are to be linked or associated with each other. The fact that the electronic device 98 is linked to or associated with the telematics unit 14 may then be stored in a user profile in one of the databases 72 at the call center 24.

Registering may otherwise be accomplished by placing a call (using, e.g., the telematics unit 14, the electronic device 98, or other communications device) to the call center 24, and submitting a request to a call center advisor 62, 62' to associate the telematics unit 14 with the device 98, and visa versa. More specifically, the call is received at the switch 68, which directs the call to an appropriate advisor 62, 62' (or to an appropriate call center if the call is received at a data center). Upon authorizing the caller (e.g., who accurately responds to a number of challenge questions), the caller may submit the identification information of the electronic device 98 to the advisor 62, 62', who/which may use the information to associate, and thus register the device 98 with the telematics unit 14. This information is stored in the user profile in the database 72. In an example, the advisor 62, 62' may access the call center webpage and associate the two devices 14, 98 together (e.g., as if the user had accessed the webpage himself/herself).

It is also possible to register the electronic device 98 using a user interface inside the vehicle 12, such as a touch screen (e.g., a NAV screen or the like) that is operatively associated with telematics unit 14. In an example, the touch screen may be the same as the display 80 depicted in FIG. 1. This method enables the user to register the device 98 substantially the same way as he/she would register the device 98 by accessing the call center webpage. It is to be understood that, in this method, preferences (which are described in detail below) are automatically stored in the user profile stored in the memory 38 of the telematics unit 14 as soon as the preferences are set by the user.

It is to be understood that the user (or caller) may want to associate or link a number of electronic devices 98 with a single telematics unit 14. For instance, the telematics unit 14 may be located in a vehicle 12 that is shared by two or more people (such as a family vehicle, where the father, mother, and children are each able to operate the vehicle 12), and each person owns or has in his/her possession an individual cellular phone. Accordingly, each of the phones (i.e., devices 98) may be associated with the same telematics unit 14 using any of the examples of the registration process described herein. Similarly, it is to be understood that the user (or caller) may want to associate or link one device 98 with multiple telematics units 14. For instance, a family may own multiple vehicles 12, each of which has its own telematics unit 14, and wish to associate one family member's device 98 with each of the telematics units 14. Accordingly, the single device 98 may be associated with each telematics unit 14 using any of the example methods disclosed herein.

In yet another example, the user (or caller) may want to associate a number of different types of electronic devices 98 with a single telematics unit 14. For instance, the user may be in possession of a cellular phone and another device capable short range wireless communications, and both devices may be associated with the telematics unit 14 using any of the registration methods described above.

In an example, during the registering of the electronic device 98 (via the call center webpage, via the touch screen, or during the phone call with the call center 24), the user may select preferences which are stored in a user profile in the database 72 at the call center 24. The user profile may, for example, be set up at the time the user creates his/her account with the call center 24 (such as when the user subscribes to telematics services offered by the telematics service provider), and may include personal information of the user, such as the user's name, garage address, billing address, account settings, etc. The user-selected preferences that are stored in the user profile may include, for instance, an identification of the electronic device(s) that may be used in the vehicle 12 (via, e.g., the MDN of the device(s) or short range wireless security codes/names (also referred to as BLUETOOTH® names)).

Upon registering the device 98, the user may also be able to select preferences for how message(s) containing interoperability information is/are to be presented to the user through the telematics unit 14 and/or through the electronic device 98. For instance, the user may select the format and/or appearance of the messages if the messages are sent as text-based or text- and graphic-based messages. The user may also select to have the messages converted to speech so that an audio message may be played to the user, e.g., through the audio component 60 operatively connected to the telematics unit 14 via the bus 34. In this case, the call center 24, via the data aggregator 100 (or the processor 84 in instances where the data aggregator 100 does not have its own processor), may formulate the text of a text-based or a text- and graphic-based message into speech using a text-to-speech program, and the speech-based (or audio) message may be transmitted to the telematics unit 14 during a voice call with the telematics unit 14 (or with the short range connected electronic device 98) or to the electronic device 98 during a voice call with the electronic device 98. Details of the message containing the interoperability information that is formulated by the call center 24, and details of the modes of transmitting the message to the telematics unit 14 and/or to the device 98 will be described further below.

In instances where the user registers more than one electronic device 98, the user-selected preferences identified above may be the same for each of the registered devices 98, or may be different for each respective device 98. In the latter case, the user may, for instance, select to have text-based messages sent to certain electronic devices 98, and to have voice messages sent to other electronic devices 98.

It is to be understood that the preferences are set until the authorized user accesses the call center webpage or the like, and removes or otherwise changes the preferences associated with one or more the electronic devices 98. The removed/changed preferences will take effect as soon as they are stored in the user profile, and remain as active preferences until the user's subscription with the call center 24 expires or is canceled, or for the duration predefined by the user. It is further to be understood that authorized persons alone are allowed to remove/change the preferences stored in the user profile. Those who are authorized to remove/change the preferences are pre-established by the user who originally set up the subscription account, or by others who the user has indicated as being authorized to change the preferences. Those who are authorized to remove/change the preferences may be identified, by the user, when the preferences are originally set up and/or may be added or removed at any subsequent time.

The examples of the registration process described above may otherwise be used to set up the user preferences alone, and not to associate or otherwise link the electronic device 98 with the telematics unit 14. In this case, the telematics unit 14 is unaware of the device 98 (i.e., the devices 14, 98 are not pre-associated or linked) until the device 98 is paired with the telematics unit 14 upon setting the device 98 (and/or the telematics unit 14) to a short range wireless connection mode, which enables the device 98 to pair with the telematics unit 14 (and/or the electronic device 98) and establish a short range wireless connection for the first time. In this example, the telematics unit 14 is not actively searching for the device 98 until after the device 98 has become a recognized device. It is to be understood that the device 98 is considered to be a recognized device as soon as it is paired with the telematics unit 14 for the first time. The telematics unit 14 adds the newly paired device 98 to a list of recognized devices (i.e., those devices that have previously been paired with the telematics unit 14) upon pairing for the first time, and is therefore aware that the device 98 exists. Likewise, the device 98 adds the newly paired telematics unit 14 to a list of recognized devices, and is therefore aware that the telematics unit 14 exists. Afterwards, the telematics unit 14 (and/or the electronic device 98) automatically looks for the other device whenever the telematics unit 14 (or the mobile device 98) is powered on. Thus, whenever the device 98 is inside the vehicle 12 (or within proximity of the short range wireless connection system 48), the telematics unit 14 detects the presence of the device 98 (or the device 98 detects the presence of the telematics unit 14) and automatically connects with the device 98 (or the telematics unit 14) upon making the detection.

As previously mentioned, the electronic device 98 and the telematics unit 14 may otherwise be connected via a wire which is connected to a USB connection port both on the device 98 and inside the vehicle 12. In an example, the USB connection port in the vehicle 12 is operatively connected to the audio component 60, to the display 80, or other appropriate device internal to the vehicle 12.

Once the electronic device 98 and the telematics unit 14 have been connected, the telematics unit 14, via a computer program/computer readable instructions executed by the processor 36, pulls data (identified by reference character D in FIG. 2) from the electronic device 98. This step is shown at step 202 in FIG. 2. The data D pulled from the device 98 may include any data that may be useful for testing and/or assessing the interoperability of the device 98 and the vehicle 12 within which the device 98 is then-currently located and being operated. Examples of such data D may include the type of electronic device (e.g., a cellular phone, a smart phone, an mp3 player, a notebook computer, etc.), the make and model of the electronic device (e.g., an iPhone 4G®, a BlackBerry® Bold™ 9780 smartphone, an HP Mini 110 notebook computer, etc.), the manufacturer of the electronic device (e.g., Apple, Inc., Hewlett-Packard Co., etc.), the operating system used by the electronic device, the cellular carrier of the device (e.g., Verizon®, Sprint®, etc.), applications stored on and/or used by the electronic device, and/or the like.

Figure 2:
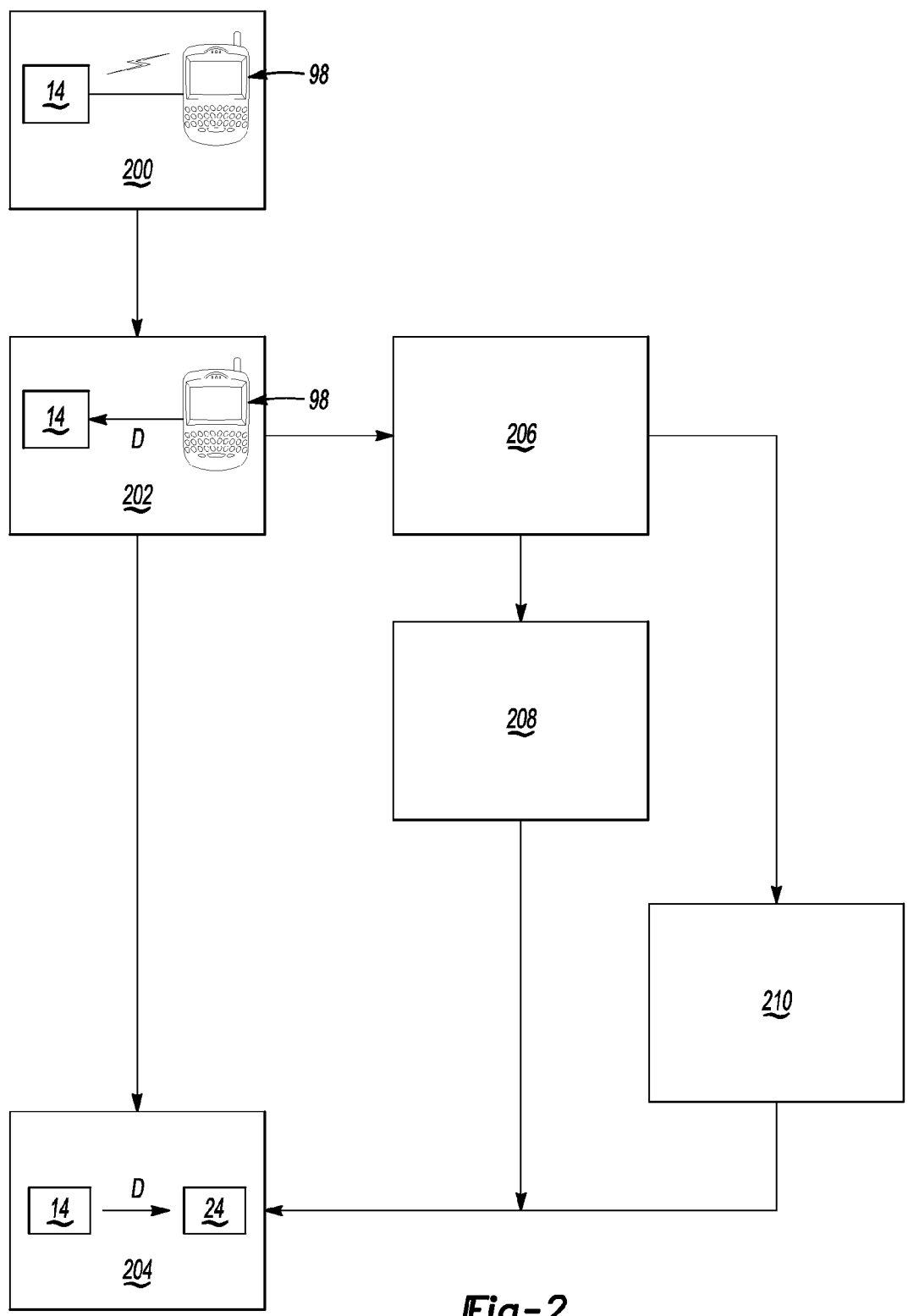
FIGS. 2 and 3 are flow diagrams that, together, depict examples of a device-interoperability notification method.

The data D pulled from the electronic device 98 by the telematics unit 14 is forwarded from the telematics unit 14 to the data aggregator 100 at the call center 24, as shown at step 204 in FIG. 2. In one example, the pulling and the transmitting of the data D to the call center 24 may occur as soon as the electronic device 98 is connected to the telematics unit 14. This is shown by the sequence of steps 202 and 204 in FIG. 2. In this example, the data D that is immediately pulled from the device 98 is packetized, and the telematics unit 14 automatically initiates a voice connection with the communications module 86 at the call center 24. During this voice connection, the packetized data is transmitted over a packet-switch network. Upon receiving the data, the communications module 86 at the call center 24 identifies the type of data that is received, and then forwards the data to the data aggregator 100 so that the data may be used for interoperability testing and/or assessment.

The data pulled from the device 98 may otherwise be forwarded directly to the data aggregator 100 from the telematics unit 14. In this case, the data aggregator 100 unpacketizes the data so that the data may be used for interoperability testing and/or assessment.

In another example, the data D obtained from the telematics unit 14 is temporarily stored in the electronic memory 38 of the telematics unit 14 (shown at step 206 in FIG. 2). The data D is stored until the telematics unit 14 recognizes a trigger to initiate a vehicle data upload (VDU) event, at which time the data is formatted into a suitable form for transmission (e.g., as packetized data, circuit switched data, or the like). This is shown at step 208. Once formatted, the data D is transmitted to the call center 24, as shown at step 204, but in this example, the transmission is accomplished by the VDU unit 91 as a VDU 91 initiated call. Examples of triggers that may initiate the VDU event include requests for the data from the call center 24, preset periodic triggers including triggers for an automatic transmission on a certain day and time of day every week, every month, etc., ignition on, recognition of device 98 pairing or connection, or the like. After the data D has been transmitted to the call center 24, the data D may be automatically removed from the electronic memory 38. In some examples, after the data D has been transmitted to the call center 24, the data D may remain stored in the electronic memory 38 for some predetermined time or until it is overwritten with new data received from the device 98. Storing the data D for some time after its transmission to the call center 24 may be desirable, for example, if the connection is terminated during transmission, if the data D is inadvertently lost at the communications module 86 or the data aggregator 100.

In the examples of the transmission of the data D to the call center 24 described above, the data D is pulled from the electronic device 98 so long as the user is a subscriber. In other words, the data D is pulled from the subscribing user's device 98 unless the user has indicated, e.g., in his/her subscription, that he/she does not want data pulled from his/her device 98. Receipt of the data D pulled from the device (referred to hereinbelow as electronic device data) may be desirable so that the call center 24 can continuously obtain information from subscriber vehicles and the different types of electronic devices being used in those vehicles. This information may be used to assess the interoperability of an electronic device with a particular vehicle, and the results of the assessment may i) be sent back to the user in some form to apprise the user of the interoperability issue(s) with the device 98 and/or ii) be reported onto the consumer-accessible webpage 96. The results of the assessment are also stored in, e.g., the master database at the call center 24. In other cases, the data may be stored in the master database for later use in interoperability testing and/or assessment methods. In this respect, each subscriber vehicle may be an instrument for obtaining electronic device data for a large cross section of electronic devices being operated in different vehicle types.

In some instances, the user may select to control when data D of his/her electronic device 98 is transmitted to the call center 24. This selection may have been made, e.g., during the registration of the device 98, upon updating his/her user profile via the call center webpage, or during a phone call with an advisor 62, 62' at the call center 24. The data D pulled from the electronic device 98 may, in an example, be transmitted to the call center 24 in response to a subscriber- or user-initiated transmission. This transmission may be performed in response to a user-initiated decision to transmit the data D, such as when the user realizes that his/her electronic device 98 is not working properly inside the vehicle 12 and that he/she may need some assistance from the call center 24. In an example, the data D is automatically pulled from the device 98 as soon as the connection is established between the devices 14, 98. This data D is temporarily stored in the electronic memory 38, as shown at step 206, and remains stored in the memory 38 until the user initiates a transmission of the data D to the call center 24. This user-initiated transmission is shown at steps 210 and 204 in FIG. 2. As previously mentioned, initiation of the transmission of the data may occur, by the user, upon realizing that the electronic device 98 (e.g., a function or an application of the device 98) is not working properly. When this occurs, in an example, the user may actuate a transmission button operatively connected to the telematics unit 14, or press an icon on a touch screen of the display unit 80 that is connected to the telematics unit 14 via the bus 34. Upon actuating the button or icon, a signal is sent to the telematics unit 14 to initiate a VDU event with the call center 24. During the VDU event, the VDU unit 91 pulls the data D from the memory 38 and reformats the data D into a suitable format for transmission to the call center 24, as previously described. In another example, the user may initiate a data transmission by reciting a request for the transmission into the microphone 28 connected to the telematics unit 14. The telematics unit 14 initiates a VDU event with the call center 24 in response to the verbal request.

The user-initiated transmission may also be performed in response to a request for the data from the call center 24. In an example, the call center 24 may send periodic requests to the vehicle 12 for electronic device data, and in response to the request, the user may actuate a transmission function associated with the telematics unit 14 via any of the methods previously described. In some cases, the telematics unit 14 will automatically send the data to the call center 24 without any involvement of the user.

It is to be understood that vehicle data along with the electronic device data may be used, by the data aggregator 100 (or the processor 84 at the call center 24 if the data aggregator 100 does not have its own processor), to identify the type of vehicle that the electronic device 98 is then-currently being used in. In an example, when the electronic device data is transmitted to the call center 24 (via any of the transmission modes and/or methods described above), vehicle data is also transmitted to the call center 24. Examples of vehicle data include the make and model of the vehicle 12 within which the device 98 is located, the year the vehicle 12 was built, any vehicle systems and/or equipment present on the vehicle 12 that were not standard for the make and model of that vehicle 12, the telematics unit identifier, the version of the telematics unit hardware and software, and the like. In another example, the vehicle data may have been previously stored in the user profile at the call center 24, and the data aggregator 100 (or the processor 84) may refer to the user profile for the vehicle data upon receiving the electronic device data from the telematics unit 14. For instance, the vehicle 12 may be identified by the data aggregator 100 (or the processor 84), which may use the mobile dialing number (MDN) of the telematics unit 14 (that transmitted the electronic device data) to retrieve the proper user profile from the database 72.

Figure 3:
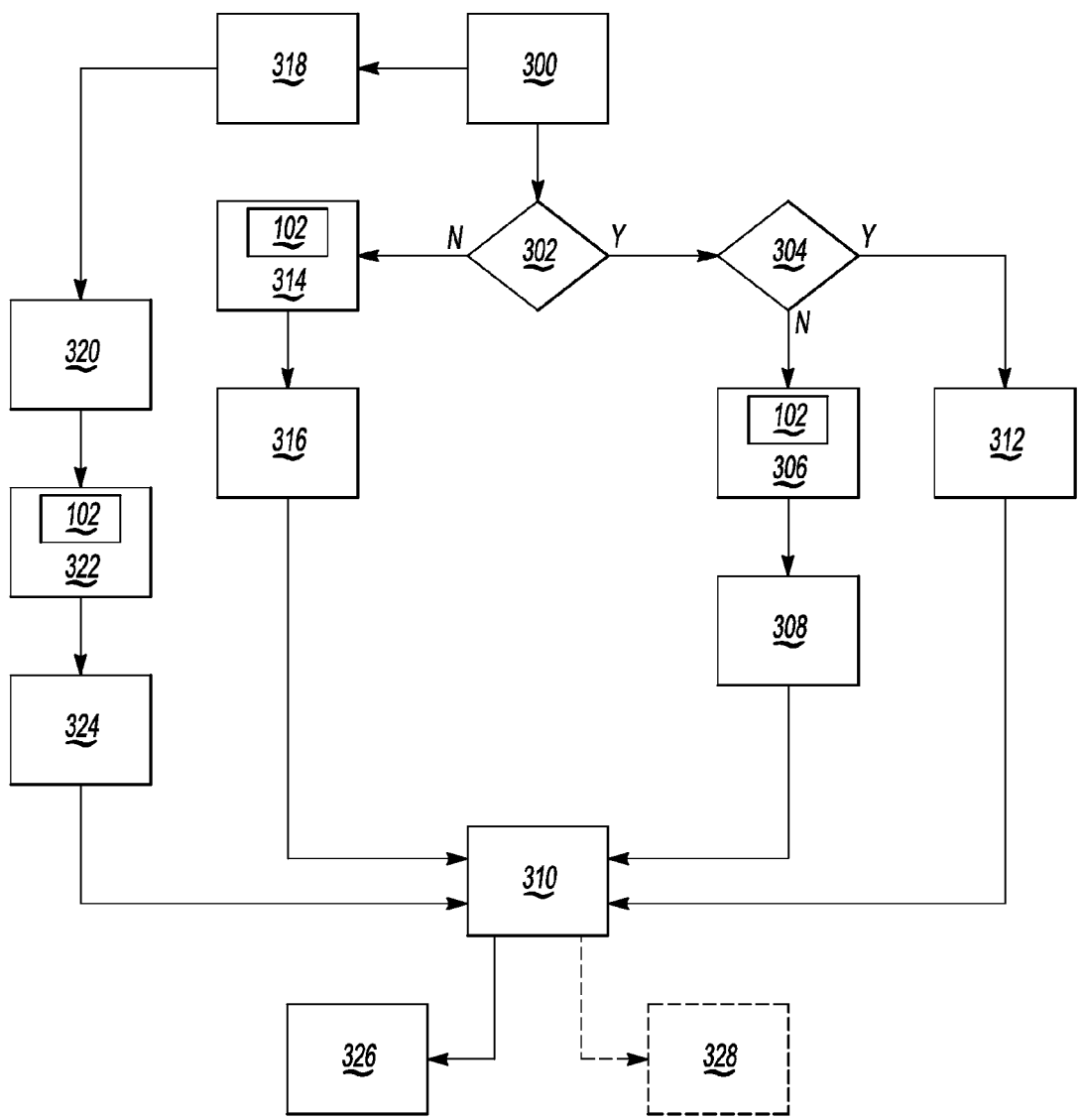

Referring now to FIG. 3, the electronic device data is transmitted to, and received by the call center 24. This is shown at step 300. For instance, the data D is received by the communications module 86 at the call center 24, and the communications module 86 identifies the data D as being data that may be used for interoperability testing. Upon making this identification, the data D is forwarded to the data aggregator 100. In another example, the data D is received by the data aggregator 100 without having to go through the communications module 86. The data aggregator 100 includes computer programs/computer readable instructions to determine if the device 98 from which the data D was retrieved is known to have an interoperability issue with the vehicle 12 within which the device 98 is then-currently located, as shown by decision box 302. The determination may be accomplished, for example, based on the method used to transmit the data D to the call center 24. For instance, if the data D was sent by a user-initiated transmission, it may be assumed that the user is having difficulties operating his/her electronic device 98 in the vehicle 12. In another instance, the data aggregator 100 may assume that an interoperability issue exists with a particular electronic device 98 and a particular vehicle 12 if the call center 24 receives a request from the vehicle 12 for instructions on how to make the electronic device 98 compatible with the vehicle 12. In each of these example instances, the data aggregator 100 would determine that yes the device 98 is known to have an interoperability issue with the vehicle 12.

In yet another instance, the data aggregator 100 may refer to the master database that contains different combinations of electronic devices and vehicle types to determine whether an interoperability issue is known to exist. The data in the master database may provide an indication of whether or not an interoperability issue between a particular device and a particular vehicle type has previously been determined to exist. The master database may, for instance, be categorized and searchable according to the type of electronic device 98 or the type of vehicle 12 within which the device 98 is being used. As an example, the data aggregator 100 may query the master database using the device type, and a list of vehicles known to have an interoperability issue with the device type may be generated in response to the query. As another example, the data aggregator 100 may query the master database using the vehicle make and model, and a list of devices 98 known to be interoperable with the vehicle may be generated in response to the query. The information about particular electronic device and vehicle interoperability may have been included in the master database upon learning the information from, e.g., vehicle requests or the absence of requests for compatibility information of the particular device type and the particular vehicle type. The information may also have been included in the master database after interoperability testing has been performed on the device and the vehicle type, and the results from the test indicate that an interoperability issue does or does not exist.

In still another example, the data aggregator 100 may determine the existence of an interoperability issue upon receiving a voice recording from the user. When the telematics unit 14 has built-in voice recording functionality, the user may recite a message into the microphone 28 and the message is recorded as, for example, a .wav file. The message may indicate a problem with the device 98, for example, "an application on my phone will not work" or "my video player worked for a bit and then stopped". The .wav file may be sent, along with the device 98 identifier and pulled data D, to the communications module 86 or data aggregator 100. The .wav file may indicate the existence of an interoperability issue.

In an example, the data aggregator 100 determines that the electronic device 98 is known to have an interoperability issue with the vehicle type within which the device 98 is located (during step 302 in FIG. 3), and then determines whether or not interoperability testing has been previously performed on that electronic device-vehicle type combination at decision box 304. This determination may be made by comparing the electronic device data and vehicle data with the master database. As briefly mentioned above, the master database may also contain previously obtained results of every electronic device that has been tested thus far for interoperability with various vehicle types. The interoperability results may include i) the problems a user may encounter when using the electronic device inside a particular vehicle type, and ii) instructions for how to make that device compatible with that vehicle type. In an example, the instructions for how to make the device compatible with the vehicle type may be stored in a sub-database (i.e., one that is separate from the database containing the interoperability testing results), and upon determining that an interoperability issue exists from the master database, the data aggregator 100 may refer to the sub-database to obtain the instructions when formulating the notification message that will be described in detail below.

In an example, the data aggregator 100, upon reviewing the master database, may determine that interoperability testing has not yet been performed on the electronic device 98 for use in the vehicle type as the vehicle 12. For instance, the device 98 may be one that is newly-available to consumers, and its compatibility with a particular vehicle type is unknown due, at least in part, to the very small window of time to perform the interoperability testing before the devices were released to the public. In some cases, interoperability testing may not have been performed on electronic devices 98 that are rare, or perhaps not often used. In these cases, the call center 24 may be unaware of the existence of these devices 98 until an interoperability issue is recognized by the user or until an interoperability issue is deemed prevalent based on data received and reviewed by the data aggregator 100 at the call center 24. There may, of course, be many other reasons as to why interoperability testing may not have been performed on a particular device with a particular vehicle type.

When the data aggregator 100 determines that interoperability testing has not yet been performed, at step 304, the data aggregator 100 may forward the data to the testing facility 102 to perform the interoperability testing, at step 306. In instances where the testing facility 102 is part of the call center 24, the data may be forwarded directly from the data aggregator 100 to the computer equipment of the testing facility 102 via the call center data bus 76. In instances where the testing facility 102 is located remotely from the call center 24, the data aggregator 100 may forward the data back to the communications module 86, which reformats the data (e.g., re-packetizes the data), and transmits the data to the remotely located testing facility 102.

While some of the interoperability testing at the testing facility 102 may be performed utilizing computer-based testing procedures, at least some of the interoperability testing may be performed physically, e.g., by personnel performing previously determined laboratory experiments and/or procedures at the testing facility 102. Typically, the interoperability testing is performed according to a test plan, which may include assessing a calling function of the electronic device 98 inside the vehicle type, assessing a call-receiving function of the electronic device 98 inside the vehicle type, assessing an audio playing function of the electronic device 98 inside the vehicle type, assessing an Internet access function of the electronic device 98 inside the vehicle type, and/or assessing a vehicle system control function of the electronic device 98 inside the vehicle type. Each of these tests may be performed by connecting a prototype of the electronic device 98 to a prototype of the vehicle type, and attempting to perform each of the functions mentioned above (e.g., the calling function, the call-receiving function, the audio playing function, etc.). Physical prototypes may be used to perform one or more of the tests. For example, the calling function may be tested by calling a prototype of the electronic device 98 from another communications device while the prototype of the electronic device 98 is connected to the prototype of the vehicle 12. If the calling function does not appear to work during the testing, then the testing facility 102 may initiate additional tests to find way(s) to make the device compatible with the vehicle so that the calling function works properly. For another example, the call switching function of the electronic device 98 may be tested after two calls are received by the electronic device 98 while it is connected to the vehicle 12, and the user is unable to effectively place one or both of the callers on hold. This is faulty device behavior that may be analyzed at the test facility 102 after data is transmitted to the aggregator 100. The test facility 102 is an engineering/research facility that will analyze the errant behavior of the device 98 and make appropriate software and/or hardware modifications to correct the device 98 behavior.

Results from the testing of the prototype of the device 98 are generated at the testing facility 102 at step 308, and these results may include a list of the function(s) of the device 98 that do not work with the particular vehicle type (e.g., it may have been found that the audio playing function of mp3's stored on an IPhone® 4 may not work when the phone is connected to a 2011 Chevrolet® Cruze, or the calling function and call-receiving function of the Motorola Droid A855 does not work when the phone is connected to a 2008 Chevrolet® Malibu). The results from the testing may further include instructions for how to make the function(s) of the electronic device 98 work when the device 98 is being operated inside the vehicle 12. In other words, the instructions may be used to assist the user with making the device 98 compatible with the vehicle 12.

The test results generated during the interoperability testing are input into the computer equipment at the testing facility 102 in instances where the results are generated from testing that is physically performed by personnel at the facility 102. Inputting may be accomplished, e.g., by typing the test results into the computer using a keyboard, touch screen, or the like. Inputting may otherwise be accomplished utilizing a previously-established connection between the computer and the equipment used to perform the testing. For example, data obtained by the testing equipment may automatically by input into the computer via a wired or wireless connection therewith. In any event, the inputted results are stored in a database on the computer. The test results generated by the computer during the testing, on the other hand, do not have to be input into the computer, and are automatically stored in the database on the computer as the results are generated.

The test results stored in the database on the computer at the testing facility 102 are sent to the data aggregator 100 at the call center 24 (e.g., via the bus 76 if the testing facility 102 is part of the call center 24, or as packetized data during a packet data session established between the remote testing facility 102 and the call center 24). The test results may be used by the data aggregator 100 to formulate a message for the vehicle 12, represented by step 310. This message may contain information pertaining at least to the interoperability of the electronic device 98 and the vehicle 12 based, at least in part, on the results generated from the interoperability testing. For instance, the message may include some information identifying one or more interoperability issues with the electronic device 98 and the vehicle 12, and one or more instructions for how the user can fix the identified interoperability issues. In other words, the instructions enable the user to make changes to the device 98 (e.g., changes to default settings of the device 98 so that the device 98 can properly connect with the telematics unit 14, the audio component, or other vehicle systems; changes to the connection of, or the type of connection wire used; etc.) and/or to the vehicle 12 (e.g., changes to default settings of the telematics unit 14 so that the telematics unit 14 recognizes instructions from the device 98; changes to default settings of the audio component 60 so the audio component 60 recognizes the device 98, etc.) so that the device 98 is now compatible with the vehicle 12. In an example, the message may state something similar to "your phone has issues connecting to the Internet", and may further provide some assistance or advice such as "if you would like to get an Internet connection established, please follow these instructions . . . ." In some instances, the message may be formulated to direct the user to review the consumer-accessible webpage 96 mentioned above, which includes information pertaining to the interoperability issue(s) of the device 98 and how to fix them.

In an example, the message may be formulated as a text-based message, where the text is provided in a human-readable and human-understandable form. The information contained in the text-based message may be organized in any manner, such as by category, interoperability issues, or the like. In some cases, the text-based message may be organized according to user-selected preferences stored in the user profile. In an example, if the interoperability testing determined that there are two interoperability issues with the device 98 and the vehicle 12, the text-based message may be organized by issue, where one issue may be presented first and then the instructions for how to fix the issue will follow. Then, the other issue will be presented after the instructions to resolve first issue and then the instructions for how to fix the other issue will follow. In another example, the text-based message may be organized according to category. For instance, if the device 98 is a smart phone (such as an iPhone® 4), the categories may include connectivity, outgoing calling, call-receiving, text messaging, Internet access, audio compatibility, etc. In the text-based message, any interoperability issues falling under one or more of these categories may, e.g., be highlighted, flagged, underlined, differently colored (e.g., the categories having issues may be red, while the other categories that do not have issues may be green), and/or the like. In some cases, the categories that do not have interoperability issues will have a N/A, none, or some other similar designation next to those categories, while the categories that have interoperability issues may have instructions for solving or fixing these issues next to those categories.

In an example, the message may be a short message service (SMS) message and/or an electronic mail (e-mail) message. Both of these messages are text-based messages as previously described. In an example, the text-based message contains text alone. In another example, one or more words of the text-based message may also be hyperlinks to an Internet webpage containing graphics and/or videos demonstrating how to carry out the instructions contained in the text message.

If the electronic device 98 is having trouble connecting to the vehicle 12 (e.g., pairing or wired connection takes place, but phone calls cannot be made, etc.), the message(s) may be sent directly to the electronic device 98 instead of to the telematics unit 14. Additionally, the message(s) may be sent after the vehicle 12 is placed into park mode. The call center 24 may request that the telematics unit 14 upload a notification upon recognizing that park mode has been entered, and in response to this notification, the data aggregator 100 may push the message(s) to the vehicle 12 and/or device 98.

The message may, in an example, be formulated to includes graphics as well as text, and this message may be sent, e.g., as a multimedia message service (MMS). The graphics may include pictures or diagrams corresponding to the text-based instructions that may visually assist the user with carrying out the instructions. For instance, a picture or diagram may be positioned next to the corresponding instruction in the message itself.

Furthermore, the MMS message may be a video alone, where there is no corresponding text. This video may demonstrate how to carry out instructions for fixing a particular interoperability issue. It is to be understood that a single video may be sent as an MMS message. Thus, if more than one interoperability issue exists between the electronic device 98 and the vehicle 12, then more than one MMS message may be sent to the vehicle 12 where each MMS message addresses a particular interoperability issue.

In still another example, the message may be formulated as a voice message, where instructions for fixing an interoperability issue are recited to the user as human-understandable speech. In this example, the data aggregator 100 may formulate a text-based message, and then convert the text of the text-based message into speech utilizing a text-to-speech program run by its own processor, or by the processor 84 at the call center 24. The data aggregator 100 may then establish a voice connection with, e.g., the telematics unit 14 using the communications module 86, and the speech-based message (i.e., the voice message) may be played to the user over the speakers 30, 30' during the voice connection.

In some cases, all of the information (e.g., the identification of the interoperability issues and the instructions for fixing the issues) may be contained in a single message. In these cases, the user does not have to further communicate with the call center 24 unless he/she is still having trouble using the electronic device 98 in the vehicle 12. When the user continues to have trouble using the electronic device 98 in the vehicle 12, the user may initiate a voice connection with the call center 24, and work with an advisor 62, 62' (who may be part of the test facility 102) to solve the interoperability issues.

It is also contemplated herein to provide interactive messaging to address interoperability issues with the device 98 and the vehicle 12. For instance, a series of messages may be sent to the user at various stages for fixing an interoperability issue, and each message may be formulated each time a new stage begins. For example, a first message may be sent to the vehicle 12 that identifies the interoperability issue, and asks the user if he/she wants assistance with fixing the issue. The user may respond to the message, e.g., by sending a reply message (e.g., a reply SMS message if the first message was sent as an SMS message) with a yes or no. If the user replies with a yes, then the data aggregator 100 may formulate a new message containing the first stage of the instructions for fixing the interoperability issue, and send this message to the vehicle 12. The user may reply to this message for the next stage of instructions when he/she is finished with the first stage, or may reply with questions if he/she is having trouble with the first stage of instructions. In either case, the data aggregator 100 may formulate yet another message in response to the user's latest reply. The exchange of messages may continue until the interoperability issue has been fixed, or when the user decides not to fix the interoperability issue. Other interactive messaging systems may involve the transmission of instructions, questions, messages, etc. using the webpage 96. The initial message sent to the user may instruct him/her to visit the webpage 96 for further instructions and/or online assistance.

The message formulated for the vehicle 12 at step 310 in FIG. 3 may be sent (as an SMS message, an MMS message, an e-mail, or a voice message) to the telematics unit 14 of the vehicle 12, as shown at step 326. The user may view the message utilizing the display 80 (e.g., to view SMS messages, MMS messages, an e-mails). Voice message, however, may be played through the speakers 30, 30' of the audio component 60.

The message(s) may also be sent to the electronic device 98, as shown at step 328. The type of message sent to the device 98 depends, at least in part, on the capabilities of the device 98. For instance, if the device 98 is a smart phone, then the message may be sent as any of the message types identified above. However, if the device 98 is a cellular phone that does not have Internet access capabilities, then the device 98 cannot be used to view e-mail messages.

Referring back to step 304 in FIG. 3, in an example, if the data aggregator 100 determines that interoperability testing has already been performed on the same type of device as device 98 at step 304, the data aggregator 100 will refer to, and extract previously stored results from the master database at step 312. This previously stored data includes previously stored test results generated from other data obtained from at least one other electronic device that is the same type (e.g., make and model) as the user's electronic device 98. The other electronic device(s) was/were disposed in another/other subscriber vehicle(s). The stored data may include test results for the same type of device in a variety of other subscriber vehicles, where each of the other subscriber vehicles may be of a different type. For example, the master database may have stored therein interoperability test results for a particular smart phone in a variety of different vehicles. In an example, the data aggregator 100 looks up the user's device 98 type and the type of vehicle 12 that the device 98 is then-currently being used in, and retrieves the previously stored data from the master database. Since the test results are already available, the data aggregator 100 does not have to forward the electronic device data to the testing facility 102. Instead, the data aggregator 100 proceeds to formulate a message for the vehicle 12 at step 310 based upon the previously stored data for the same type of device 98 and vehicle 12.

Referring back to step 302 in FIG. 3, from the data pulled from the electronic device 98, the data aggregator 100 may determine that the device 98 is not known to have any interoperability issues with the vehicle type. This determination may be made when no assumptions are made based on the method used to transmit the data D to the call center 24. In an example, this determination may be made by looking up the device type and the vehicle type in the master database. If, e.g., there is no record of the device type in combination with the vehicle type, then the data aggregator 100 will determine that the device 98 has not yet been tested with the vehicle type and thus no interoperability issues are yet known to exist. In another example, the device type and the vehicle type combination may be present in the master database, but the master database indicates that there are no interoperability issues currently known. In this example, the data aggregator 100 will also determine that no interoperability issues are known to exist for the device 98 type in combination with the vehicle 12 type.

In instances where there is no record of the device type and the vehicle type in the master database, the data aggregator 100 may send the electronic device data to the testing facility 102 to perform the interoperability testing on the device 98 with the vehicle type as described above. This step is shown at step 314 in FIG. 3. The results from the testing are generated at step 316, and these results are sent back to the data aggregator 100. The data aggregator 100 stores the test results in the master database, and also utilizes the test results to formulate a message for the vehicle 12 at step 310.

The determination that an interoperability issue is not known may also be made based on the method used to transmit the data D to the call center 24. In those cases where the user does not request assistance for making his/her device 98 compatible with the vehicle 12, but rather, for example, data is automatically transmitted to the call center 24, upon receiving the data D pulled from the electronic device 98 at step 300 in FIG. 3, the data aggregator 100 may simply store the data in the master database at step 318. At a later time, the data aggregator 100 may receive one or more sets of other data pulled from other devices of the same type as the electronic device 98, and this data is also stored in the master database in combination with the previously stored data of the device 98. This step is shown at 320 in FIG. 3. Upon receiving the other data, the data aggregator 100 may send all of the data stored in the master database (i.e., the data pulled from the electronic device 98 as well as the data pulled from the other device(s)) to the testing facility 102 to perform the interoperability testing on the device type with the vehicle type, represented at step 322. In this example, the data aggregator 100 may determine to send all of the data to the testing facility 102 in response to a user request, or after some amount of data is collected for a particular device type, or after some predetermined time (e.g., once a week). The results generated from the testing at step 324 are sent back to the data aggregator 100, which formulates a message for the user at step 310.

In some instances, it may be desirable for the call center 24 to identify a cross section of electronic devices currently being used in selected vehicle types. This cross section of devices may be useful for narrowing interoperability testing to those devices that are actually being used, as opposed to performing interoperability testing on those devices that are rarely used. Once the cross section of electronic devices has been identified, personnel at the testing facility 102 may be able to purchase or otherwise obtain those devices, and use the purchased or otherwise obtained devices for testing with different vehicle types or vehicle bench simulators.

In an example, the cross section of electronic devices may be identified by extracting selected information (such as device manufacturer and model number, device operating system, short range wireless connection profiles, cellular carrier, etc.), and utilizing the information to identify the electronic device type that is being used. The information and identified electronic device type may be stored in the master database as a single data entry. The data aggregator 100 may then collect as many data entries as possible from a plurality of other electronic devices. In one example, each of the device types identified are tested at the testing facility 102. In another example, the device types that make up a significant portion of the total number of data entries qualify for testing. For instance, if 20% of the users use an IPhone® 4, then the IPhone® 4 may be tested at the testing facility 102. However, if less than 5% of the users use an IPhone® 2, then the IPhone® 2 may not be selected for testing at the testing facility 102.

Examples of the method for assessing an interoperability between the electronic device 98 and the mobile vehicle 12 will now be described in conjunction with FIGS. 1 and 4. This method generally involves connecting the electronic device 98 with the telematics unit 14 of the vehicle 12 via the methods previously described. This step is shown at step 400 in FIG. 4. The telematics unit 14 pulls the data D from the electronic device 98 as soon as the connection is made, and then the data D obtained by the telematics unit 14 is transmitted to the call center 24 (step 402). The data D is transmitted to the call center 24 i) as soon as the data is received by the telematics unit 14, ii) upon recognizing a trigger to initiate a VDU event, or iii) in response to a user-initiated transmission. All of these transmission methods were previously described in conjunction with FIG. 2.

Figure 4:
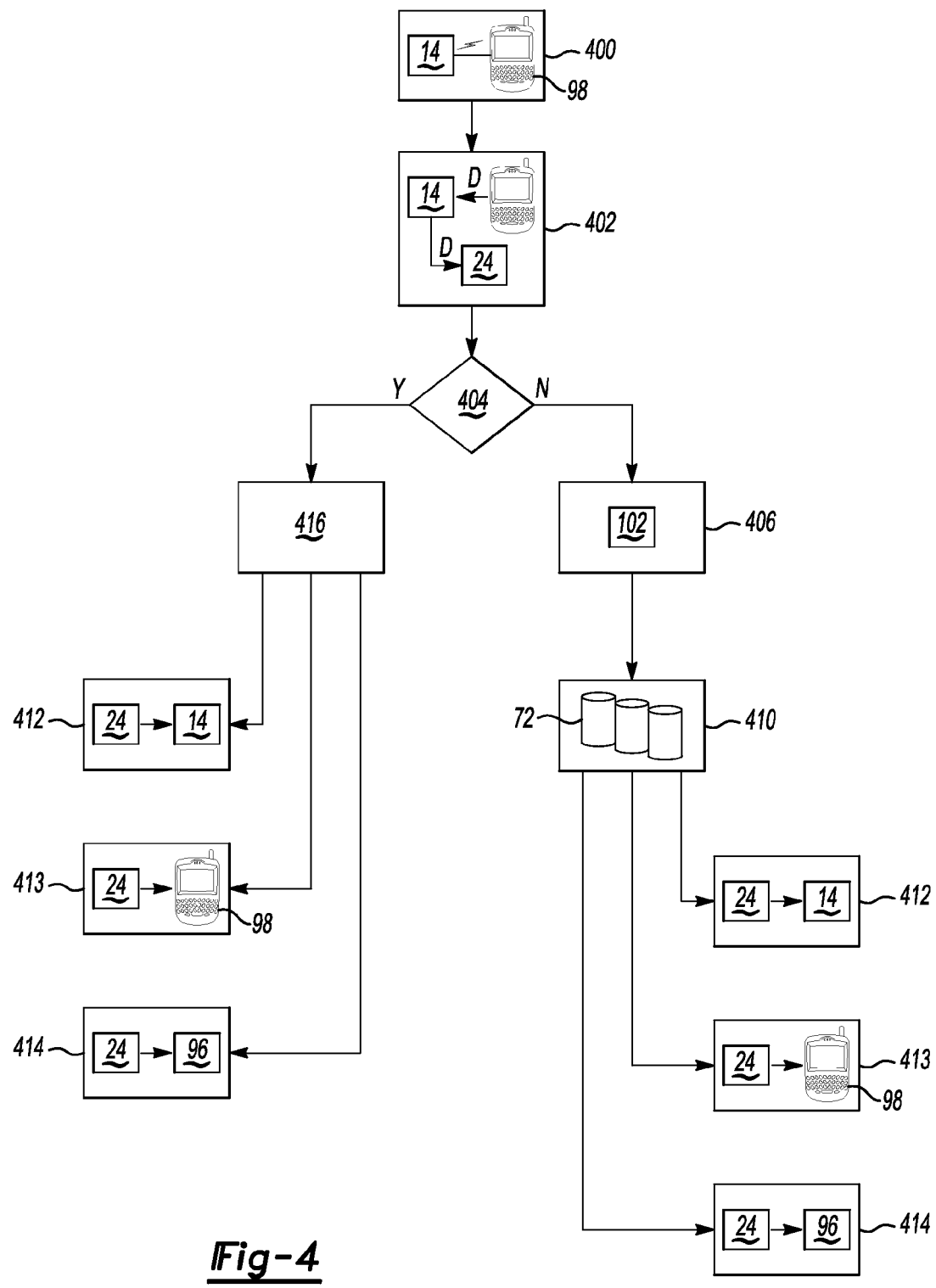
FIG. 4 is a flow diagram depicting examples of a method for assessing an interoperability between an electronic device and a vehicle.

Upon receiving the data D at the call center 24, the data aggregator 100 running suitable computer software programs determines if the electronic device 98 was known to have an interoperability issue with the vehicle type, as shown by decision box 404 in FIG. 4. Via the same process as previously described for the method shown in FIG. 3, the data aggregator 100 may determine that the device 98 was known to have interoperability issues with the vehicle type. In this case, the device 98 is not sent to the testing facility 102, and the data aggregator 100 retrieves data stored in the master database at step 416. The data retrieved is used to formulate a message for the user, and this message may be transmitted to the telematics unit 14 (shown at step 412) or to the electronic device 98 (shown at step 413). The formulation and transmission of the message to the user was previously described in conjunction with FIG. 3.

As shown at step 414, the results (e.g., in the form of one or more blog message(s)) may also be posted to the webpage 96 and the user may retrieve/view the message(s) by accessing the page 96. Reporting of the results generally involves establishing an Internet connection, and then uploading the results onto the host server 94 of the webpage 96. The webpage 96 may include all of the information contained in the master database, and the results obtained are added to the data already present on the webpage 96. This continuously updates the webpage 96. Thus, the webpage 96, which is accessible to consumers via their subscription through the telematics service or call center 24, may be used by consumers as a resource to obtain up-to-date information for addressing any interoperability issues that the user may come across while using his/her device 98 inside his/her vehicle 12.

Referring back to step 404, if the data aggregator 100 determines that the device 98 was not known to have an interoperability issue with the vehicle 12, then the data is sent to the testing facility 102 to perform interoperability testing at step 406. The results generated at step 406 are sent back to the data aggregator 100, which stores the results in the master database at step 410. In an example, the data aggregator 100 formulates a message based upon the results, and sends the message to the user, shown at step 412 or the device 98, shown at step 413.

In another example, the data aggregator 100 reports the stored results onto the consumer-accessible webpage 96, as shown at step 414 and as previously described.

While several examples have been described in detail, it will be apparent to those skilled in the art that the disclosed examples may be modified. Therefore, the foregoing description is to be considered non-limiting.

The invention claimed is:

1. A device-interoperability notification method, comprising:
   establishing a connection between an electronic device and a telematics unit operatively disposed in a vehicle;
   via the telematics unit, transmitting data obtained from the electronic device to a data aggregator at a call center;
   via the data aggregator, from the data, recognizing that an interoperability issue exists between the electronic device and the vehicle within which the electronic device is disposed; and
   sending a message to one of the telematics unit or the electronic device via a communications module at the call center, the message including information pertaining to an interoperability of the electronic device with the vehicle;
   wherein:
   i) the data aggregator at the call center receives the data, and wherein the method further comprises:
      identifying, at the call center, that the electronic device is one that was not previously known to have an interoperability issue with a type of the vehicle within which the electronic device is then-currently disposed;
      testing the electronic device at a testing facility to determine the interoperability of the electronic device with the vehicle type, the testing of the electronic device being accomplished according to a test plan performed at the testing facility;
      generating test results from the testing; and
      from the test results, formulating the message including the information pertaining to the interoperability of the electronic device with the vehicle; or
   ii) the data is received at the call center, and wherein the method further comprises:
      storing the data in a database at the call center;

receiving at the call center other data obtained from an other electronic device, the other electronic device being of the same type of device as the electronic device from which the stored data was obtained, thereby recognizing that the type of device is utilized by multiple users; and testing the electronic device at the testing facility to determine the interoperability of the electronic device with the vehicle type, the testing of the electronic device being accomplished according to the test plan performed at the testing facility.

2. The method as defined in claim 1 wherein the transmitting of the data to the data aggregator at the call center occurs i) upon establishing the connection between the electronic device and the telematics unit, ii) via a vehicle data upload event, or iii) via a subscriber-initiated transmission.

3. The method as defined in claim 2 wherein the transmitting of the data is accomplished via the subscriber-initiated transmission, and wherein the method further comprises:
upon establishing the connection, obtaining the data from the electronic device via the telematics unit;
storing the data in an electronic memory of the telematics unit; and
actuating a function associated with the telematics unit to initiate the subscriber-initiated transmission.

4. The method as defined in claim 2 wherein when the transmission is accomplished upon establishing the connection between the electronic device and the telematics unit, the data is immediately and automatically transmitted to the data aggregator at the call center.

5. The method as defined in claim 1 wherein the data is received at the call center, and wherein the method further comprises utilizing additional data previously obtained from a plurality of additional electronic devices in combination with the transmitted data to identify a plurality of types of electronic devices being used by vehicle subscribers.

6. The method as defined in claim 5 wherein the additional data previously obtained is stored in a database at the call center.

7. The method as defined in claim 1 wherein the message is one of a short message service (SMS) message, a multimedia message service message (MMS), a voice message, or an electronic mail message.

8. The method as defined in claim 1 wherein the message contains information pertaining to the interoperability of the electronic device and the vehicle, the information including any of a notification of the interoperability issue or advice for how to make the electronic device compatible with the vehicle.

9. A device-interoperability notification method, comprising:
establishing a connection between an electronic device and a telematics unit operatively disposed in a vehicle;
via the telematics unit, transmitting data obtained from the electronic device to a data aggregator at a call center;
via the data aggregator, from the data, recognizing that an interoperability issue exists between the electronic device and the vehicle within which the electronic device is disposed; and
sending a message to one of the telematics unit or the electronic device via a communications module at the call center, the message including information pertaining to an interoperability of the electronic device with the vehicle;
wherein the transmitting of the data to the data aggregator at the call center is accomplished via a vehicle data upload event, and wherein the method further comprises:
upon establishing the connection, obtaining the data from the electronic device via the telematics unit;
storing the data in an electronic memory of the telematics unit; and
in response to a trigger, via the telematics unit, initiating the vehicle data upload event.

10. A device-interoperability notification method, comprising:
establishing a connection between an electronic device and a telematics unit operatively disposed in a vehicle;
via the telematics unit, transmitting data obtained from the electronic device to a data aggregator at a call center;
via the data aggregator, from the data, recognizing that an interoperability issue exists between the electronic device and the vehicle within which the electronic device is disposed; and
sending a message to one of the telematics unit or the electronic device via a communications module at the call center, the message including information pertaining to an interoperability of the electronic device with the vehicle;
wherein the data is received at the call center, and wherein the method further comprises:
identifying, via the data aggregator at the call center, that the electronic device is a device type that was previously known to have an interoperability issue with a type of the vehicle within which the electronic device is then-currently disposed; and
upon identifying, determining whether interoperability testing has previously been performed on the electronic device;
wherein:
i) the interoperability testing has not been performed on the electronic device, and wherein the method further comprises:
testing the electronic device at a testing facility to determine the interoperability of the electronic device with the vehicle type, the testing of the electronic device being accomplished according to a test plan performed at the testing facility;
generating test results from the testing; and
from the test results, formulating the message including the information pertaining to the interoperability of the electronic device with the vehicle; or
ii) the interoperability testing has been previously performed on the electronic device, and wherein the method further comprises:
extracting previously stored test results from a database at the call center, the previously stored test results being generated from other data obtained from a plurality of other electronic devices disposed in a plurality of other subscriber vehicles; and
from the test results, formulating the message including the information pertaining to the interoperability of the electronic device with the vehicle.

11. The method as defined in claim 10, further comprising reporting the test results on a remotely accessible page.

12. A method for assessing an interoperability between an electronic device and a vehicle, comprising:
establishing a connection between an electronic device and a telematics unit operatively disposed in the vehicle;

via a telematics unit, transmitting data obtained from the electronic device to a data aggregator at a call center;

identifying, via the data aggregator, that the electronic device is one that was not previously known to have an interoperablitiy issue with a type of vehicle within which the electronic device is then-currently disposed; and testing, at a testing facility, an interoperability of the electronic device with the vehicle type;

wherein upon testing, the method further comprises:
generating test results from the testing;
storing the test results in a database at the call center; and
one of:
via a communication module at the call center, transmitting a message to one of the telematics unit or the electronic device, the message being formulated from the test results and including information pertaining to the interoperability of the electronic device with the vehicle type; or
via the data aggregator, reporting the test results on a remotely accessible page.

13. The method as defined in claim 12 wherein the testing is accomplished according to a test plan performed at the testing facility, and wherein the test plan includes any of assessing a calling function of the electronic device inside the vehicle type, assessing a call-receiving function of the electronic device inside the vehicle type, assessing an audio playing function of the electronic device inside the vehicle type, assessing an Internet access function of the electronic device inside the vehicle type, or assessing a vehicle system control function of the electronic device inside the vehicle type.

14. A device-interoperability notification system, comprising:
an electronic device disposed in a vehicle;
a telematics unit with which the electronic device is connected, the telematics unit to extract data from the electronic device;
a data aggregator at a call center in selective and operative communication with the telematics unit, the data aggregator to receive the data from the telematics unit;
a processor operatively associated with the data aggregator;
computer readable code including instructions for recognizing that an interoperability issue exists with the electronic device, wherein the computer readable code is executable by the processor and is encoded on a non-transitory, tangible computer readable medium; and
a communications module in selective and operative communication with the data aggregator at the call center, the communications module transmitting a message to one of the telematics unit or the electronic device, the message including information pertaining to an interoperability of the electronic device with the vehicle
wherein:
i) the data aggregator at the call center receives the data, and wherein the computer readable code further includes instructions to:
identify, at the call center, that the electronic device is one that was not previously known to have an interoperability issue with a type of the vehicle within which the electronic device is then-currently disposed;
generate test results from testing of the electronic device having been performed at a testing facility to determine the interoperability of the electronic device with the vehicle type, the testing of the electronic device having been accomplished according to a test plan; and
from the test results, formulate the message including the information pertaining to the interoperability of the electronic device with the vehicle; or
ii) the data is received at the call center, and wherein the computer readable code further includes instructions to:
store the data in a database at the call center;
receive at the call center other data obtained from an other electronic device, the other electronic device being of the same type of device as the electronic device from which the stored data was obtained, and thereby recognize that the type of device is utilized by multiple users; and
generate test results from testing of the electronic device having been performed at the testing facility to determine the interoperability of the electronic device with the vehicle type, the testing of the electronic device having been accomplished according to the test plan.

15. The system as defined in claim 14, further comprising:
the database including additional data previously obtained by the data aggregator from a plurality of other electronic devices; and
computer readable code for identifying a plurality of types of electronic devices being used by subscriber vehicles upon assessing the data obtained from the telematics unit in combination with the additional data, wherein the computer readable code for identifying executable by the processor and is encoded on a non-transitory, tangible computer readable medium.

16. The system as defined in claim 14, further comprising a remotely accessible page upon which the test results are reported.

* * * * *